United States Patent
Rutz et al.

[11] Patent Number: 6,092,815
[45] Date of Patent: Jul. 25, 2000

[54] ACTIVE CHASSIS IN A MOTOR VEHICLE

[75] Inventors: Rüdiger Rutz, Esslingen; Martin Winkler, Schwaikheim, both of Germany

[73] Assignee: Daimler Chrysler Aktiengesellschaft, Stuttgart, Germany

[21] Appl. No.: 09/203,152

[22] Filed: Dec. 1, 1998

[30] Foreign Application Priority Data

Dec. 1, 1997 [DE] Germany ................. 197 53 205

[51] Int. Cl.$^7$ ........................................... B62B 5/02
[52] U.S. Cl. .................... 280/5.505; 280/5.506; 280/5.508; 701/38
[58] Field of Search ............... 280/5.505, 5.506, 280/5.507, 5.508; 701/38

[56] References Cited

U.S. PATENT DOCUMENTS

| | | | |
|---|---|---|---|
| 4,801,155 | 9/1989 | Fukushima et al. | 280/5.508 |
| 4,961,595 | 10/1990 | Fukushima et al. | 280/5.506 |
| 5,104,143 | 4/1992 | Yonekawa | 280/550.6 |
| 5,228,719 | 7/1993 | Funkyama et al. | 280/5.505 |
| 5,253,174 | 10/1993 | Ingaki et al. | 701/38 |
| 5,488,562 | 1/1996 | Otterbein et al. | 701/38 |

FOREIGN PATENT DOCUMENTS

| | | |
|---|---|---|
| 38 21 609 | 12/1989 | Germany . |
| 38 18 188 | 9/1991 | Germany . |
| 41 17897 | 12/1992 | Germany . |
| 43 23 544 | 1/1994 | Germany . |
| 44 14022 | 10/1996 | Germany . |
| 2 252 277 | 8/1992 | United Kingdom . |

Primary Examiner—Lanna Mai
Assistant Examiner—Elaine Gort
Attorney, Agent, or Firm—Kenyon & Kenyon

[57] ABSTRACT

An active chassis in a motor vehicle has a controllable suspension system which includes passive spring elements between a wheel of the vehicle and a body of the vehicle as well as supporting units which are provided for the spring elements and can be adjusted by a control signal. Transducers are provided for the supporting units to detect state variables of the supporting units. In addition, a control unit is provided to generate the control signal from a setpoint signal which can be preselected via an input element and an actual signal which is determined from the detected state variables. To provide an easily implemented method of controlling the roll moment distribution between front and rear axles of the vehicle, the roll moment distribution to be set between the front and rear axles of the vehicle can be preselected as the setpoint signal in the input element. In addition, an actual signal representing the actual roll moment distribution can be determined in the control unit as a function of the state variables of the supporting units.

15 Claims, 3 Drawing Sheets

# ACTIVE CHASSIS IN A MOTOR VEHICLE

FIELD OF INVENTION

The present invention relates to an active chassis in a motor vehicle and to a method of controlling a chassis.

BACKGROUND INFORMATION

German Patent Application No. 44 14 022 A1 describes a chassis equipped with an active suspension system between the wheels and the body of the vehicle. The suspension system has a passive spring element assigned to each wheel and an active, controllable supporting unit on which the spring element is supported and whose stroke position can be adjusted with the help of a hydraulic displacement unit.

To control the supporting units, first the stroke positions of the supporting units are detected by displacement sensors, and the actual supporting forces acting between the wheels and the body of the vehicle are determined from the stroke positions in an electronic controller according to a linear relationship. The supporting forces are compared in the electronic controller with predetermined setpoint supporting forces calculated from setpoint stroke positions. The control deviation then results in a control signal to adjust the supporting units.

With this device and this method, it is possible to adjust the desired supporting forces directly by displacement measurements. However, German Patent Application No. 44 14 022 A1 does not describe other possible uses.

German Patent Application No. 41 17 897 A1 describes a control concept for damping the stroke, pitch and roll motions of a chassis. This concept, which also permits adjustment of the roll torque distribution between the front and rear axles as an additional degree of freedom of the "chassis" system, is based on a variant of skyhook damping, as a result of which a controlling force, which depends on the rate of buildup, is determined. To perform the control, vertical buildup rates must first be determined at selected locations on the chassis. The vertical buildup rates are then used to calculate the rates of stroke, roll and pitch, which are then converted to quasi-modal rates from which setpoint forces for actively adjustable hydraulic cylinders are determined.

The control concept known from German Patent Application No. 41 17 897 A1 is capable of influencing a majority of degrees of freedom of the system. However, several control matrices with a plurality of coefficients are needed for the control concept due to its complexity. Further, any determination of optimal coefficient values will be of great expense. Another disadvantage is that any buildup rates must be measured by sensors and the measurement of the buildup rates are more complicated that measurement of simple changes in position.

SUMMARY OF THE INVENTION

An object of the present invention is to provide an easily implemented method of controlling the roll moment distribution between the front and rear axles of a vehicle.

The present invention provides an active chassis in a motor vehicle, with a controllable suspension system (1) comprising passive spring elements (3) between a wheel (5) of the vehicle and the vehicle body (6), as well as supporting units (4) which are provided for the spring elements (3) and can be adjusted by a control signal. Transducers (7) are provided for the supporting units (4) to detect state variables of the supporting units (4), as is a control unit (8) to generate the control signal from a setpoint signal ($T_{soll}$), which is predefined via an input element (9), and an actual signal ($T_{soll}$, $MW_V$) determined from the state variables thus detected. The present invention is characterized in that the roll moment distribution ($T_{soll}$) to be set between front and rear axles of the vehicle can be preselected as the setpoint signal in the input element (9), and an actual signal ($T_{ist}$, $MW_V$) representing the actual roll moment distribution can be determined in the control unit (8) as a function of the state variables of the supporting units (4).

The present invention also provides a method of controlling an active chassis in a motor vehicle, with a controllable suspension system (1) comprising passive spring elements (3) between a wheel (5) of the vehicle and the vehicle body (6) as well as controllable supporting units (4) provided for the spring elements (3). The state variables of the supporting units (4) is detected, manipulated and compared with setpoints ($T_{soll}$, $MW_{Vsoll}$) to form a control signal. The method is characterized in that the roll moment distribution ($T_{soll}$) to be set between a front axle and a rear axle of a vehicle is preselected, and the actual roll moment distribution ($T_{ist}$) is regulated to conform to the setpoint roll moment distribution ($T_{soll}$).

The entire roll moment acting on the vehicle when turning a corner, for example, may be distributed between the front and rear axles according to a predetermined percentage distribution. The roll moment distribution is specifically set in the form of a restraint as an additional degree of freedom of the system with statically redundant vehicles with four wheels used in order to provide a positive influence on driving performance.

It is sufficient according to the present invention to preselect a desired roll moment distribution in an input element and adjust it with an actual roll moment distribution. The actual roll moment distribution can be attributed exclusively to the state variables characterizing the suspension system. In a preferred embodiment, these state variables may be position variables of the suspension strut, in particular the stroke of the supporting unit or the total stroke of the spring element and the supporting unit. The supporting force in the suspension strut can be determined from the stroke, and the roll moments acting on each axle can be determined from the supporting force.

Thus, only position variables measurable with simple position sensors enter into the calculation of the actual roll moment distribution, rather than the velocity or acceleration variables, which are more difficult to determine. If the vehicle moves essentially only on a flat road surface, it is even sufficient to record only the stroke of the supporting units. The stroke of the spring elements does not need to be determined because the spring forces attributable to the stroke of the spring elements are mutually canceled out due to the similar spring constants and spring strokes of the two suspension struts on the left and right sides of an axle.

In another preferred embodiment of the present invention, the pressure in the supporting units is determined first as a state variable and used to determine the actuator force in the supporting units. This can be used to form the basis for calculating the roll moment.

The control unit has various control elements where the measurement signals are processed further, converted as needed and compared with the setpoint signals generated in the input element. A control signal is generated from the control unit and is preferably sent to a final controlling element for adjusting the supporting units.

Specifically, several processing elements including adders, subtractors, multipliers and dividers are provided as the controlling elements. First, the roll moments are determined according to a predefined rule in a first processing element using the state variables obtained. The actual roll moment distribution is calculated from the roll moments acting on the respective axles in a second processing element downstream, including an adder and a divider. The control deviation from a predefined roll moment distribution is formed in a downstream subtractor, then in a third processing element, the control deviation is converted into a control deviation for the desired setpoint roll moment at the front axle by processing it with the total roll moment, and finally it is multiplied by a gain factor to obtain a suitably dimensioned control signal.

In another advantageous embodiment, the preselected roll moment distribution is first multiplied by the total roll moment in a setpoint manipulator, with the resulting generated signal representing the setpoint roll moment to be defined for the front axle. The actual roll moment occurring at the front axle is subtracted from this in a downstream subtractor. The difference, as the control deviation, is multiplied by a gain factor. This method has the advantage that no division needs to be performed, thus eliminating any risk of division by zero.

BRIEF DESCRIPTION OF THE DRAWINGS

The present invention is explained in more detail with the aid of the drawings, in which.

DETAILED DESCRIPTION

Figure 1:
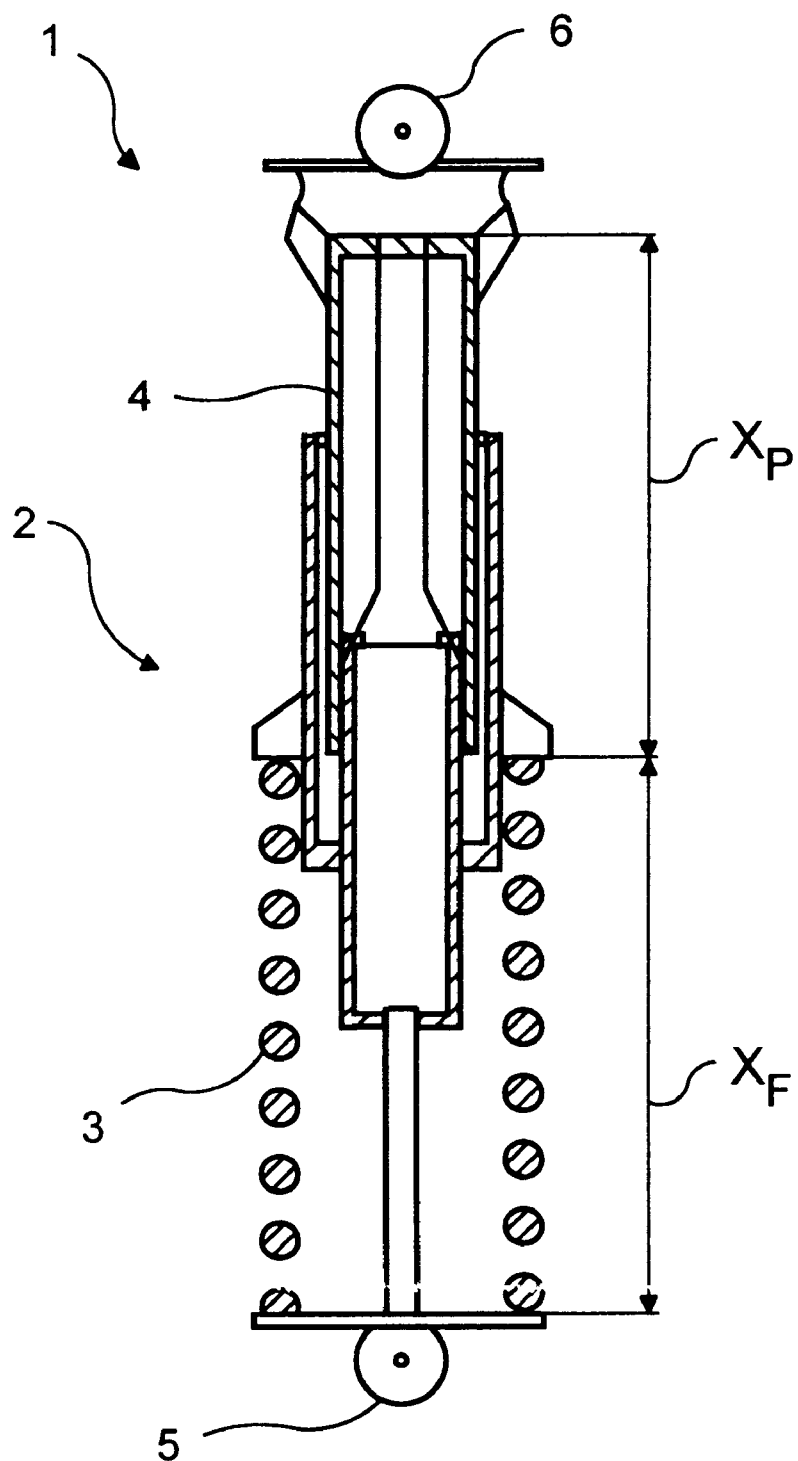
FIG. 1 shows a suspension strut having a passive spring element and an active supporting unit of the present invention.

FIG. 1 illustrates a suspension system 1 which is part of an active chassis. The suspension system 1 has a total of four suspension struts 2, each arranged between a wheel 5 of a vehicle and a vehicle body 6. Each suspension strut 2 has a passive spring element 3 and an active supporting unit 4. The active supporting unit 4 can be connected in series with the passive spring element 3. The active supporting unit 4 can be designed as a plunger. Spring element 3 has spring constant c. Supporting force F in the suspension strut 2 is calculated accordingly with the equation:

$$F=c^*(x_P-x_f)$$

where $x_P$ denotes a stroke of the supporting unit 4 or a plunger and $x_f$ denotes a spring stroke.

Figure 2:
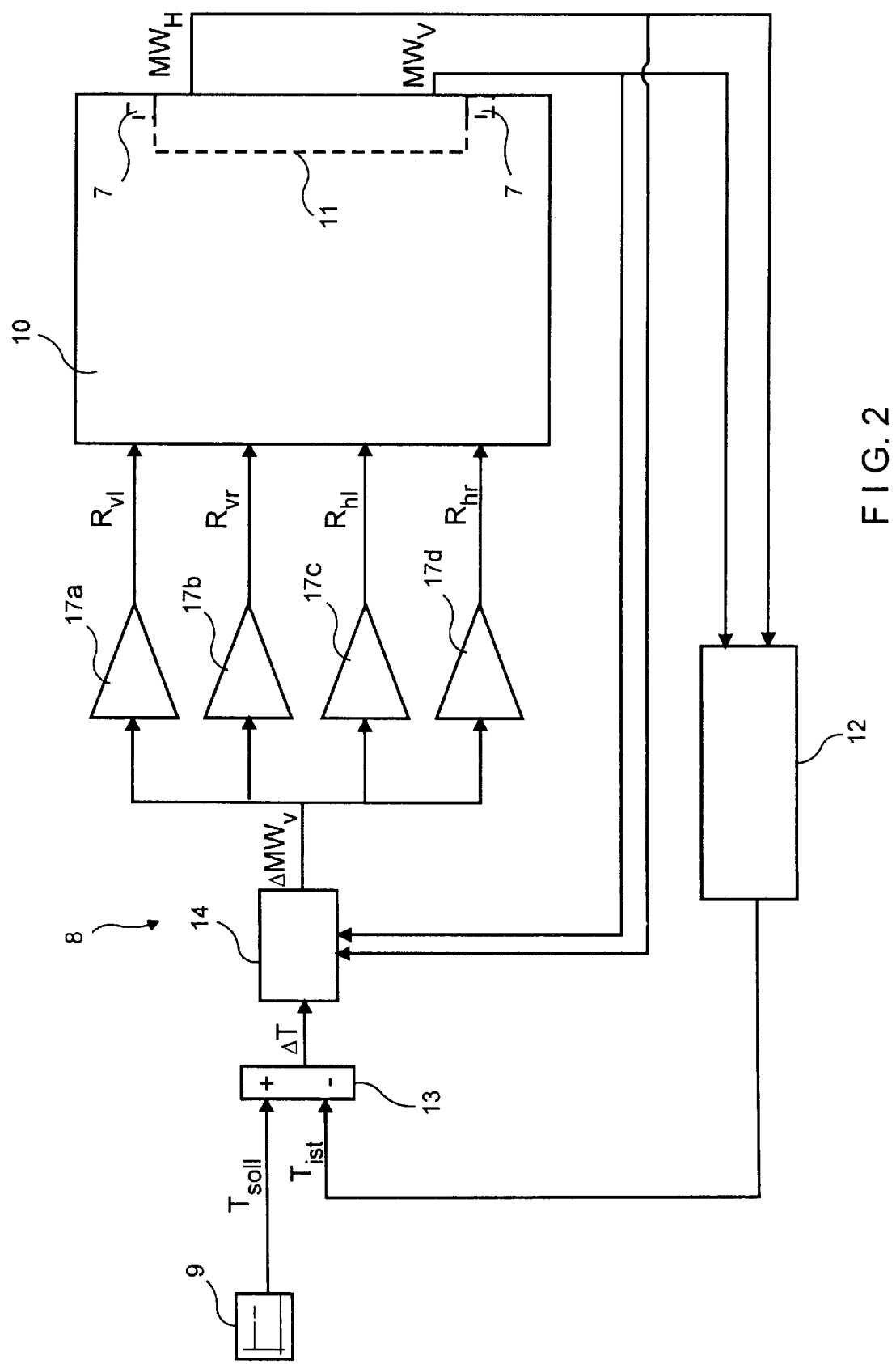
FIG. 2 shows a block diagram of an embodiment of the present invention for controlling a roll moment distribution.

FIG. 2 illustrates a control concept provided to obtain a desired distribution of any roll moments on front and rear axles, e.g., $MW_H$ and $MW_V$ respectively, as the moments rotate about a longitudinal axis of a vehicle. A vehicle with active control is represented as a controlled system in block 10. Stroke $x_P$ of the supporting unit 4 and stroke $x_f$ of the springs 3 are sensed by sensors 7, preferably designed as position pickups. The sensed stroke $x_P$ of the supporting unit 4 and stroke $x_f$ of the springs 3 are then sent to a first processing element 11 where supporting force F in a suspension strut 2 is calculated according to the above equation.

In another preferred embodiment of the present invention, sensors 7 measure only a stroke $x_P$ of a supporting unit 4. If a vehicle is on a flat road surface, this embodiment of the present invention yields control results of equivalent quality to those obtained by measuring the stroke $x_P$ of the supporting unit 4 and the stroke $x_f$ of the springs 3.

Any roll moments acting on each axle are calculated from the supporting forces. For example, roll moment $MW_V$ for the front axle is:

$$MW_V=(F_{vl}-F_{vr})^*\text{tread}_{front}$$

where $F_{vl}$ and $F_{vr}$ denote the supporting forces in the suspension struts 2 on the front left and right, respectively, and $\text{tread}_{front}$ is the tread at the front axle. Roll moment $MW_H$ for the rear axle can be calculated by a similar method.

Roll moments $MW_V$ and $MW_H$ in signal form are sent to a second processing element 12 which is downstream from first processing element 11 and represents a combination of an adder and a divider. Processing element 12 produces actual roll moment distribution $T_{ist}$ as its output signal by first adding incoming roll moments $MW_V$ and $MW_H$ in the adder and then in the divider dividing roll moment $MW_V$ acting on the front axle by the sum of the two roll moments according to the following equation:

$$T_{ist}=MW_V/(MW_V+MW_H).$$

This equation indicates that $T_{ist}$ can assume values between 0 and 1. The value 0 can indicate that the entire roll moment acting on the vehicle is applied to the rear axle. The value 1 can indicate that the entire roll moment is acting on the front axle.

Calculated actual roll moment ratio $T_{ist}$ is sent to a subtractor 13, where it is subtracted from preset roll moment distribution $T_{soll}$, which can be set at a desired value between 0 and 1 in an input element 9. Subtraction yields control deviation $\Delta T$ according to the following equation:

$$\Delta T=T_{soll}-T_{ist},$$

which is sent in signal form to a third processing element 14.

Third processing element 14 supplies as its output signal the difference $\Delta MW_V$ of the desired and actual roll moments on the front axle by multiplying control deviation $\Delta T$ by the sum of roll moments $MW_V$, $MW_H$ according to the following equation:

$$\Delta MW_V=\Delta T^*(MW_V+MW_H).$$

The roll moment difference is then sent as a signal to downstream amplifiers 17a–17d and multiplied by a gain factor $\pm K_T$, yielding control signal R according to the following equation:

$$R=\pm K_T^*\Delta MW_V.$$

The number of amplifiers 17a–17d corresponds to the number of suspension struts 2. The signs in front of gain factors $K_T$ are selected so that control signals $R_{vl}$ for the left front and $R_{hr}$ for the right rear are positive, while control signals $R_{vr}$ for the right front and $R_{hl}$ for the left rear are negative.

Control signals R have a physical dimension of a control voltage and are each sent to a final controlling element of a suspension strut 2 to control oil streams flowing into the supporting units 4 by controlling servo-valves.

Figure 3:
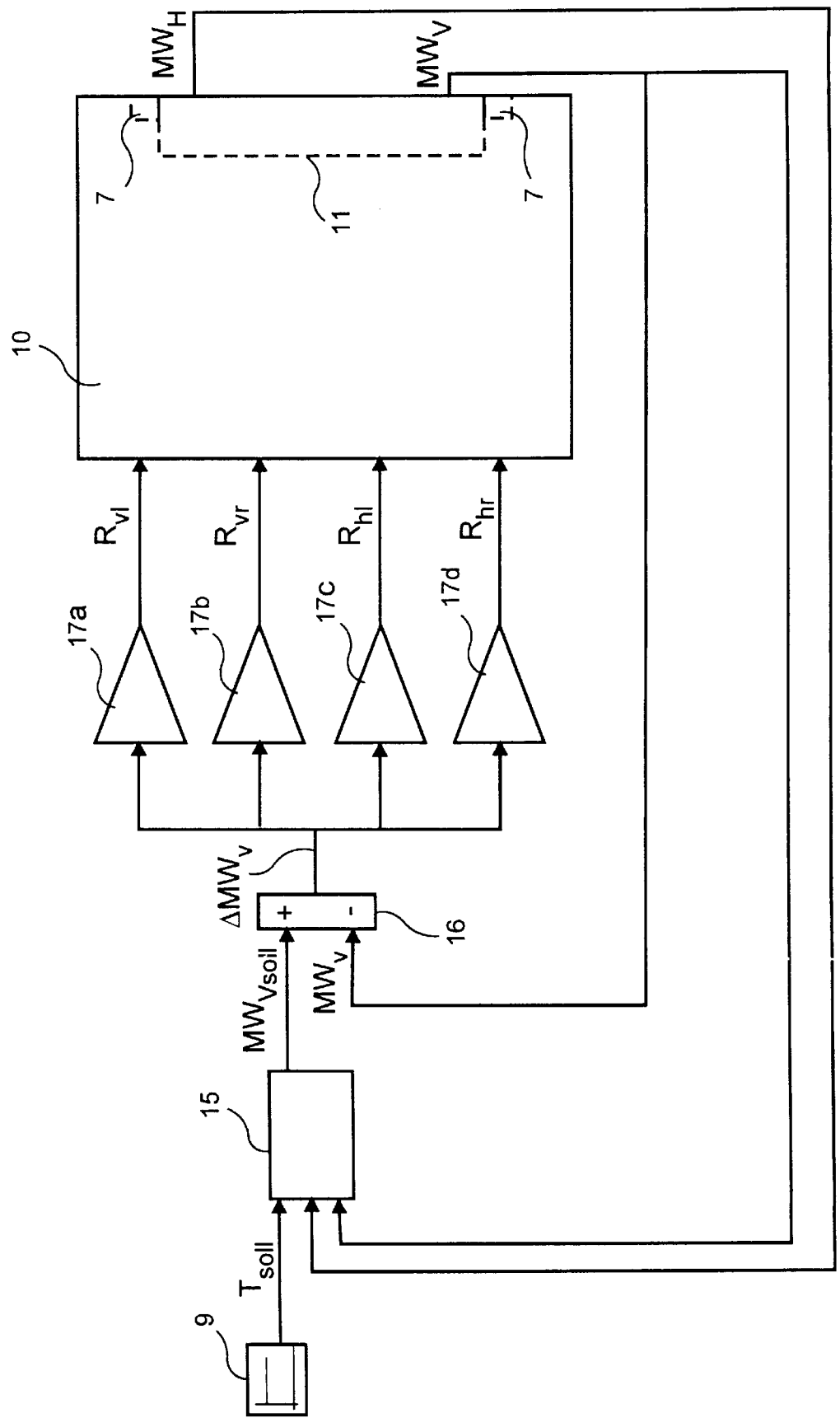
FIG. 3 shows a block diagram of another embodiment of the present invention for controlling a roll moment distribution.

FIG. 3 illustrates another embodiment of the present invention. In a chassis, represented in the block diagram, state variables are measured via transducers 7 and then used to determine roll moments $MW_V$ and $MW_H$ on the front and rear axles in first processing element 11. The roll moments $MW_V$ and $MW_H$ are sent to a setpoint manipulator 15 which is designed as an adder and multiplier. In the setpoint manipulator 15, the total of the roll moments is multiplied by roll moment distribution $T_{soll}$ preset in input element 9, thus yielding as the output value a setpoint $MW_{Vsoll}$ for the roll moment to be preset for the front axle according to the following equation:

$$MW_{Vsoll} = T_{soll} * (MW_V + MW_H).$$

In a downstream subtractor 16, actual front axle roll moment $MW_V$ (sent to subtractor 16 directly by first processing element 11) is subtracted from setpoint $MW_{Vsoll}$. As a result, any differences $\Delta MW_V$ between the desired and actual front axle roll moment is obtained as an output signal and sent as a control deviation to amplifiers 17a, b, c, d. In the amplifiers 17a–17d, the control deviation received is multiplied by positively or negatively adjusted gain factors $K_T$ in the same way as discussed above with the first embodiment of the present invention. Resulting control signals $R_{vl}$, $R_{vr}$, $R_{hl}$ and $R_{hr}$ are in turn sent as control voltages to the supporting units 4 of the suspension struts 2.

In the embodiments of the present invention, the following control equation can be obtained by combining the individual terms:

$$R = \pm K_T * [MW_V * (1 - T_{soll}) - MW_H * T_{soll}].$$

What is claimed is:

1. A controllable suspension system in an active chassis in a vehicle comprising:
   left front, left rear, right front, and right rear suspension struts, each of the suspension struts including a passive spring element, an adjustable supporting unit and a transducer, the passive spring element being located between a wheel of the vehicle and a body of the vehicle, the adjustable supporting unit being provided for the spring element, and the transducer being provided for detecting at least one of a plurality of state variables of the suspension system, an actual roll moment distribution between a front axle and a rear axle of the vehicle being determinable from the plurality of state variables;
   an input element for predefining a desired roll moment distribution between the front and rear axles of the vehicle; and
   a control unit for generating control signals for acting on the suspension system as a function of the desired roll moment distribution, control signals for the left front and right rear suspension struts being formed according to the equation:

$$R_{vl} = R_{hr} = +K_T * [MW_V * (1 - T_{soll}) - MW_H * T_{soll}]$$

and control signals for the right front and the left rear suspension struts being formed according to the control equation:

$$R_{vr} = R_{hl} = -K_T * [MW_V * (1 - T_{soll}) - MW_H * T_{soll}]$$

where $R_{vl}$ denotes the control signal for the left front suspension strut, $R_{hr}$ denotes the control signal for the right rear suspension strut, $R_{vr}$ denotes the control signal for the right front suspension strut, $R_{hl}$ denotes the control signal for the left rear suspension strut, $K_T$ denotes a gain factor, $MW_V$ denoted a roll moment on the front axle, $MW_H$ denotes a roll moment on the rear axle, and $T_{soll}$ denotes the desired roll moment distribution.

2. The controllable suspension system as recited in claim 1 wherein the state variable detected by the transducer is a stroke of the supporting unit.

3. The controllable suspension system as recited in claim 1 wherein the state variable detected by the transducers is a stroke of the spring element and a stroke of the supporting unit.

4. The controllable suspension system as recited in claim 1 wherein the state variable detected by the transducer is a pressure in the supporting unit.

5. The controllable suspension system as recited in claim 1 further comprising a first processing element, the first processing element for calculating the roll moment on the front axle and the roll moment on the rear axle as a function of the state variables.

6. The controllable suspension system as recited in claim 5 wherein forces on the front right and front left suspension struts are determined as a function of the state variables, the roll moment on the front axle being determined from the forces on the front right and front left suspension struts.

7. The controllable suspension system as recited in claim 5 wherein the roll moment on the rear axle is determined from forces on the rear right and rear left suspension struts, the forces on the rear right and rear left suspension struts being a function of the state variables.

8. The controllable suspension system as recited in claim 5 further comprising a second processing element provided downstream from the first processing element, wherein the second processing element has an adder and a divider capable of receiving signals corresponding to the roll moment on the front axle and the roll moment on the rear axle, the second processing element generating the actual roll moment distribution by dividing the roll moment on the front axle by a sum of the roll moment on the front axle and the roll moment on the rear axle.

9. The controllable suspension system as recited in claim 8 further comprising a subtractor, a control deviation being a function of a setpoint, the actual roll moment distribution, and the desired roll moment distribution.

10. The controllable suspension system as recited in claim 9 further comprising a third processing element provided downstream from the subtractor, the third processing element having an adder and a multiplier, the control deviation being multiplied in the third processing element by a sum of the roll moment on the front axle and the roll moment on the rear axle.

11. The controllable suspension system as recited in claim 1 further comprising a setpoint manipulator provided downstream from the input element, the input element generating a setpoint signal corresponding to the desired roll moment distribution, the setpoint manipulator having an adder and a multiplier, and generating a modified setpoint signal by multiplying the setpoint signal by a sum of the roll moment on the front axle and the roll moment on the rear axle.

12. The controllable suspension system as recited in claim 11 further comprising a subtractor downstream from the setpoint manipulator, the subtractor forming a roll moment deviation between the desired roll moment on the front axle and the actual roll moment on the front axle as a control deviation.

13. The controllable suspension system as recited in claim 1 further comprising an amplifier, a control deviation being provided to the amplifier.

14. The controllable suspension system as recited in claim 13 wherein the amplifier has an output signal, the output signal of the amplifier being sent as a control signal to a final controlling element of the supporting unit.

15. The controllable suspension system as recited in claim 1 wherein the supporting unit is a plunger connected in series with the spring element.

* * * * *